July 23, 1963

L. E. GLASGOW ETAL 3,098,497

FREEZE SEAL LIQUID METAL VALVE

Filed April 21, 1961

INVENTORS
ELDON O. DRYER
LYLE E. GLASGOW

BY Gerald A. Loris

ATTORNEY

July 23, 1963  L. E. GLASGOW ETAL  3,098,497
FREEZE SEAL LIQUID METAL VALVE

Filed April 21, 1961  4 Sheets-Sheet 2

INVENTORS
ELDON O. DRYER
LYLE E. GLASGOW
BY
ATTORNEY

INVENTORS
ELDON O. DRYER
LYLE E. GLASGOW
BY
Gerald A. ...
ATTORNEY

July 23, 1963   L. E. GLASGOW ETAL   3,098,497
FREEZE SEAL LIQUID METAL VALVE
Filed April 21, 1961   4 Sheets-Sheet 4

INVENTORS
ELDON O. DRYER
LYLE E GLASGOW
BY
Gerald A. Koris
ATTORNEY

United States Patent Office  
3,098,497  
Patented July 23, 1963

3,098,497  
FREEZE SEAL LIQUID METAL VALVE  
Lyle E. Glasgow, Woodland Hills, and Eldon O. Dryer, Canoga Park, Calif., assignors to North American Aviation, Inc.  
Filed Apr. 21, 1961, Ser. No. 104,743  
10 Claims. (Cl. 137—74)

The present invention relates to a leak-tight valve for regulating the flow of high temperature liquid metals, and more particularly to an improved freeze seal valve for liquid metal service.

High temperature liquid metal systems are finding wide commercial application because of their unique advantages. However, the advantages of higher temperatures and lower pressures in liquid metal systems, introduces heretofore nonexistent valve operating problems. Substantial temperature differences develop within equipment components causing severe thermal stresses, and the generally favorable high boiling temperature, low heat transfer film resistance and thermal conductivity of a liquid metal produces extremely high rates of thermal shock. In such an environment valve reliability is adversely affected.

Valves in liquid sodium cooled reactor systems, for example, must maintain tight shut-off performance under severe thermal transients at temperatures exceeding 1000° F. Conventional valve seals are unable to prevent leakage, due in part to the low viscosity of sodium at such temperatures. A sodium leak to the atmosphere or contact with water would be hazardous to both personnel and equipment because of the possibility of fire and pressure increase due to hydrogen generation. Exceptional leak tightness is further essential to prevent oxide formation, which results in corrosion and plugging of small low temperature lines.

Valves heretofore used in liquid metal service have generally been ineffective. Following several cycles of operation under high temperature fluctuations, conventional valve seats become distorted, resulting in leakage through the valve. In addition, leakage results from the collection of particulate matter in the valve which produces an abrading action between the disc and seat. Rubbing face seals have been installed between the valve disc and seat in an attempt to eliminate these problems but seals deteriorate rapidly under the high temperatures and nonlubricating properties of liquid metals. Furthermore, where the valve remains closed for extended periods, self-welding or seizing of the seat and disc may occur as a result of intimate metal-to-metal contact at high temperatures. In some cases, the valve must be removed from the line to repair the disc and seat, which is costly and may result in substantial down time of the system.

Freeze-type valves have been used for the purpose of eliminating the aforementioned disadvantages. In the operation of the freeze-type valve, the liquid metal is cooled and solidified in a restricted section of a pipe, thereby obstructing flow in a valve manner. This valve eliminates many of the leakage problems of conventional valves. However, the seal is very slow forming, extremely high rates of coolant flow are required to effect a seal, and the seal is subject both to leakage and to rapid destruction with sharp pressure and temperature changes.

The valve of the present invention is rapid operating and can maintain dependable, leak-tight integrity under the most severe operating conditions. The abrading, galling and self-welding phenomena in current valves are eliminated in this valve because the disc, or plug, need not make contact with the seat to obtain leak-tight closure. Also, in the absence of contact between the plug and seat, distortion does not render it susceptible to leakage as is the case in conventional types.

In addition, manufacturing costs are reduced because close tolerances and precise concentricity between the plug and seat are unnecessary, greater shaft misalignment and wobble is permissible and stelliting or nitriding of the valve plug and seat is not required. In essence, this invention provides a valve of simpler design and improved reliability.

Accordingly, the primary object of our invention is to provide an improved and more reliable valve which retains leak-tight integrity in a high temperature and corrosive environment notwithstanding the presence of distortion caused by severe temperature gradients and thermal stresses.

Another object of our invention is the provision of an improved freeze-type valve wherein galling and self-welding are eliminated by precluding metal-to-metal contact between the plug and seat in the closed position.

Another object is to eliminate expensive surface treatments generally added to impart wear resistant quality to the disc and seat, despite the collection of particulate matter.

Still another object of the present invention is to eliminate the usual requirement of close tolerances and concentricity between the valve plug and seat thereby simplifying its manufacture.

A further object of our valve is to obtain a leak-tight barrier to fluid flow by displacing said fluid into a narrow passage between the plug and seat and transforming it to the solid phase.

A still further object is to provide a frozen valve stem seal with fluid received from the passage between the valve plug and seat, thereby obtaining a combination of frozen valve seat and stem seals.

The above and other objects and advantages of our invention will become apparent from the following detailed description taken together with the appended claims and the accompanying drawings made a part hereof in which:

In general, this invention comprises a chamber defining a valve body having fluid ingress and egress ports and a plug positioned in the valve seat. The plug in open position permits fluid passage through the valve. In the closed position, fluid entering the valve is diverted into an annular channel formed between the plug and body chamber. Means are provided for freezing the fluid in the annulus to effect a tight seal.

Figure 1:
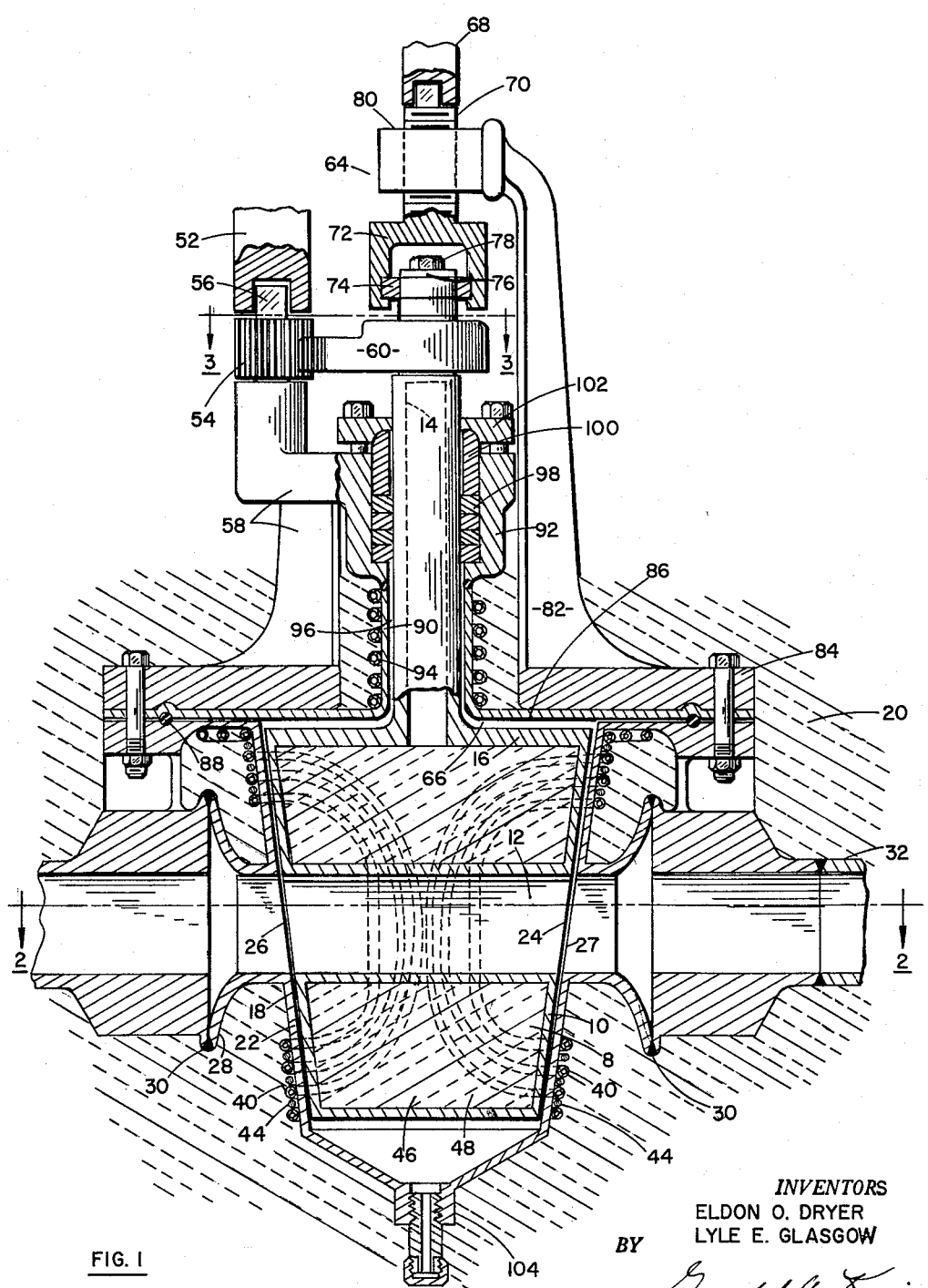
FIG. 1 is a sectional elevation view of one embodiment of our valve, showing the valve in open position.

In the preferred embodiment in FIG. 1, the primary barrier to fluid flow is a hollow, trapezoidal plug member 8 having thin, conical walls 10 and a lateral transition conduit 12 traversing the central region of the plug 8. A hollow valve stem 14, integrally connected in normal relationship to the roof 16 of the valve plug 8, suspends plug 8 in a chamber 18 of the valve body 20. The opposite end of valve stem 14 external to chamber 18, is rotatably connected to an actuating mechanism which will be hereinafter described. The chamber wall 22 is tapered and parallel to the conical wall 10 of the plug 8 and the plug is dimensioned to provide a narrow (e.g. 1/16 inch), annular channel 24 between the plug wall 10 and chamber wall 22. Penetrating the chamber wall 22, are two coaxial fluid ingress and egress ports 26 and 27 the axes of which are co-planar with the axis of the plug conduit 12. A flexible, flared flange 28, coincident with each port and integral with the chamber wall 22, is welded to valve body 20 at joint 30. The flange accommodates thermal expansion and contraction of the valve chamber and plug, thereby maintaining leak-tightness.

The valve is closed by rotating the plug 8, by actuating valve stem 14, to a position wherein the plug transition conduit 12 is removed from alignment with the chamber ports 26 and 27. Preferably, the plug conduit 12 should be angularly displaced about 90° to the axis of the chamber ports 26 and 27. In such position, direct fluid flow between the ports 26 and 27 is obstructed by plug 8 and the process liquid metal is diverted into the annular channel 24. A cooling medium having a temperature lower than the freezing point of the process metal flows adjacent to the passage 24 through coils 40 and freezes the liquid metal, thus sealing the channel against further flow. The cooling coils 40 are contiguous with the valve chamber 18, encircling the ports 26 and 27 as shown in FIG. 1, or they could be arranged to laterally circumscribe the chamber. The generally high thermal conductivity of liquid metals ensures rapid heat conduction to the coolant. In sodium systems, liquid sodium-potassium (NaK) is a suitable cooling medium. In this manner, the plug 8 and the frozen liquid metal seal in annulus 24, provide a leak-tight barrier to fluid flow.

The valve is opened by rotating the plug 8 and bringing its transition conduit 12 into alignment with the chamber ports 26 and 27, which establishes continuity between the valve chamber 18 and main piping 32. In small valves, rotation of the plug should shear the frozen seal. In larger sizes it may be necessary to melt the seal prior to actuation of the plug, and a heating coil 44 disposed between the cooling coils 40 is provided for this purpose. The heater may be comprised of tubular coils containing a hot fluid or it may use electrical resistance heating.

Figure 2:
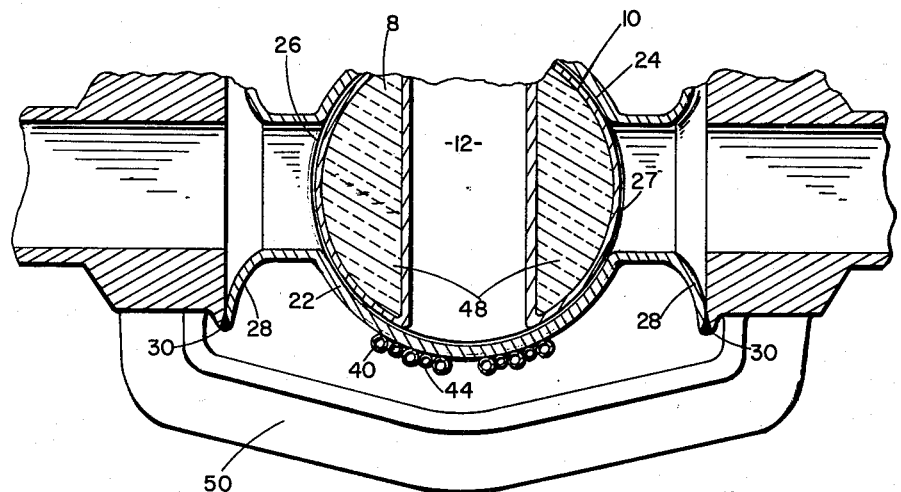
FIG. 2 is a sectional view in plan taken along the line 2—2 of FIG. 1, showing the valve in a closed position.

The coolant flow required to produce a frozen liquid metal seal in annulus 24 is primarily a function of the process liquid metal flow rate, the heat gained from the adjacent hot piping 32 and the heat transfer properties of the fluids and structural materials of the valve. The heat gains to the channel 24 are minimized by packing the plug cavity 46 and the periphery of the valve chamber with an appropriate insulation 48. Heat conduction to the channel 24 is also limited by fabricating the valve chamber 18 and plug 8 from relatively thin gauge material, for example 1/8–3/16 inch thick, and by employing a hollow valve stem 14. A brace 50, FIG. 2, rigidly joined to the valve body 20 buttresses the thin gauge valve chamber 18 and the welded joints 30, against pipeline forces resulting from thermal expansion and contraction.

Figure 3:
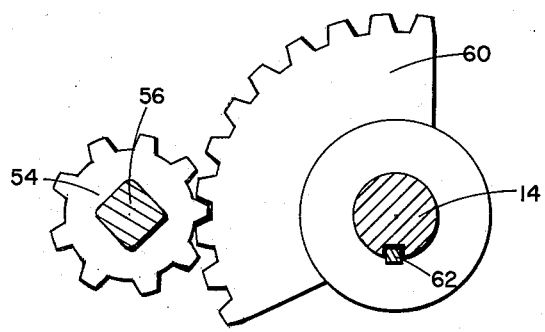
FIG. 3 is a sectional view in plan taken along the line 3—3 of FIG. 1.

The plug actuating mechanism mentioned above, is driven by a valve operator 52 comprising either a conventional handwheel or automatic mechanical actuator. Concurrent rotational motion is transmitted from the operator 52 to the pinion gear 54 through a drive shaft 56 to which the operator 52 and gear 54 are rigidly connected. The end of shaft 56 connected to operator 52 is squared off to facilitate firm engagement (FIG. 3) and its opposite end is rotatably supported in a pedestal 58. Pinion gear 54 engages a gear segment 60 which is mounted on valve stem 14 and rigidly secured by a key and keyway arrangement 62, as shown in FIG. 3. The gear segment 60 is cut from a standard size gear, selected on the basis of providing a minimum of 90° plug rotation. In operation, the valve operator 52 transmits rotational motion through shaft 56 to gear 54 which engages the valve stem gear 60, thereby actuating valve stem 14 and producing angular displacement of the valve plug 8.

When manually opening the valve, rotation of plug 8 may be prevented by the binding effect of the frozen seal 42 because there is a time delay between initial start-up of heater 44 and consequent melting of seal 42. However, means are provided for shearing seal 42 thereby releasing the plug for rotational movement. A lifting mechanism 64 moves plug 8 axially within chamber 18, which increases the clearance in channel 24 and effectively shears the seal. A space is provided between the plug 8 and chamber roof 66 to permit sufficient vertical movement of the plug for this purpose. The lifting mechanism 64 includes a handwheel or automatic operator 68, engaging a drive screw 70 having affixed to its lower end a yoke 72, on which the valve stem 14 and plug 8 are suspended. The yoke 72 and valve stem 14 are interconnected by a thrust bearing 74 which permits rotational motion of the yoke relative to the stem. A washer 76 and bolt 78 fasten bearing 74 to the stem 14. The screw 70 is threadably mounted in a boss 80 on column 82. The column 82 rests on a base plate 84 and supports plug 8, valve stem 14 and lifting mechanism 64. Actuation of the operator 68 causes rotation of drive screw 70, which simultaneously travels translationally relative to the boss 80, thereby moving plug 8 axially within chamber 18.

The valve chamber 18 is sealed by interposing a thin stainless steel gasket 86, overlaying an O-ring 88, between the contacting surfaces of the base plate 84 and valve body 20. The gasket 86 extends horizontally across the chamber 18 and forms a centrally located tubular housing 90 projecting 90° to the plane of the gasket. The housing 90 is welded at its upper end to a stuffing box 92, forming an enclosure through which valve stem 14 passes. Cooling coils 94 arranged around the circumference of the tubular housing 90 freeze liquid metal received into the valve stem annulus 96, thereby producing a positive valve stem seal therein. The stem seal is supplemented by asbestos packing 98 contained in the stuffing box 92 and held in compression by the gland 100 and follower 102.

The floor of chamber 18 has a conical configuration to facilitate drainage of particulate matter and oxides deposited in the valve during the freezing cycle. A drain 104, centrally located in the floor, provides a means of clean-out of such deposits.

Figures 4, 5:
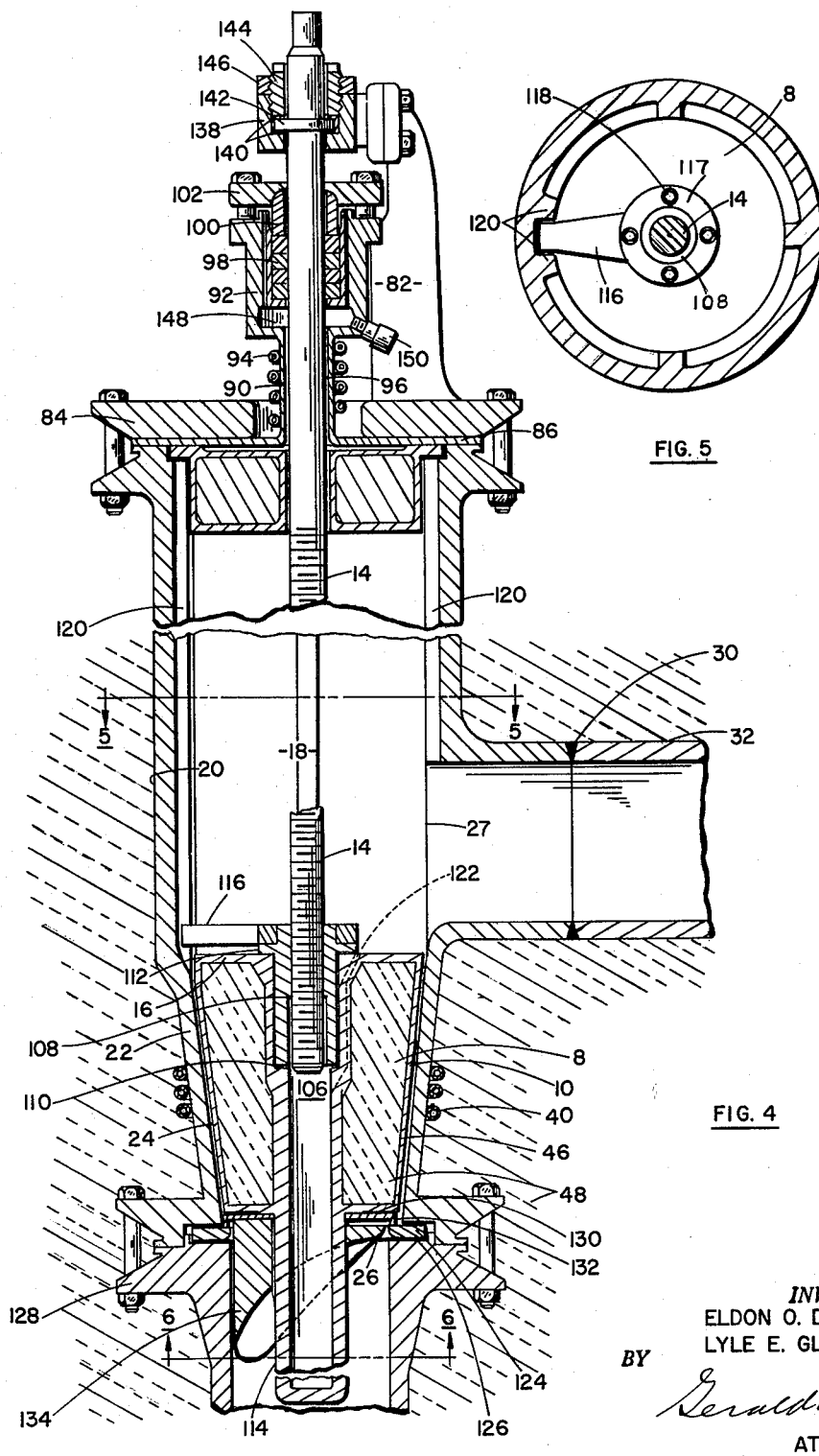
FIG. 4 is a sectional elevation view of a second embodiment of our valve.
FIG. 5 is a sectional view in plan taken along the line 5—5 of FIG. 4.

Turning now to FIG. 4, a right angle valve is shown in this embodiment of the invention. In this valve, a plug 8 is coaxially mounted in a cylindrical chamber 18, on a hollow valve stem 14 which actuates the plug translationally through the length of the chamber. A fluid inlet port 26 is coaxially positioned at one end of chamber 18 and an outlet port 27 laterally penetrates the chamber intermediate to inlet port 26 and the chamber end opposite the inlet port. The portion of the chamber 18 between the inlet and outlet ports conically converges to the inlet port 26.

The plug 8 is similar in configuration to the type described in FIG. 1. It has a tapered wall which is parallel to the converging portion of the chamber and spaced therefrom, defining an annular channel 24. In the closed position, plug 8 is in the converging portion of the valve chamber 18, and abuts the fluid inlet port 26. The area available for fluid flow is substantially diminished and the liquid metal entering the fluid port 26 is diverted into annular channel 24. The liquid metal received into the channel is frozen producing an effective seal against further leakage past valve plug 8.

A centrally located, longitudinal channel 106 is provided in the plug for receiving the valve stem 14. The valve stem 14 is threaded and a screw connection is made between the plug 8 and stem 14, utilizing an internally threaded adaptor 108 which fits into the plug channel 106, abutting against a shoulder 110. The adaptor 108 is bolted to the plug 8 through a flange 112. A cylindrical boss 114 on the base of plug 8 extends the plug channel 106 for accommodation of the valve stem 14 when the plug is retracted from inlet port 26 to the opposite end of chamber 18. The end of boss 114 is capped to prevent the liquid metal from leaking along the valve stem.

When opening and closing the valve, the plug 8 is prevented from rotating concurrently with valve stem 14 by an anti-rotation arm 116. A ring-like configuration 117 on one end of arm 116 (FIG. 5), encircles stem 14 and the adaptor 108 and rests on adaptor flange 112 for support. A common bolt connection 118, fastens the anti-rotation arm 116 and adaptor flange 112 to the valve plug 8. The anti-rotation arm 116 extends laterally across valve chamber 18 with its end locating between two lands 120 which are disposed longitudinally along the interior surface of the valve chamber 18. The lands 120 permit only translational motion of the arm 116, which prevents rotation of the valve plug 8 throughout its travel in chamber 18, as shown in FIG. 5. Additional lands 120 provided at 90° intervals on the interior surface of the valve chamber for guiding the plug travel are also shown.

A liquid metal vent port 122 located in the wall of the plug channel 106 provides communication between valve chamber 18 and the channel. When plug 8 is advanced toward the inlet port 26, the vent port 122 acts as an outlet for the passage of liquid metal which has leaked between the valve stem 14 and adaptor 108 into channel 106.

The valve seat 124 is a hardened, annular member circumscribing the inlet port 26 to the valve chamber 18 and supported on an inner ridge 126 of the coupling 128. Valve seats in high temperature liquid metal environments generally distort under the influence of severe thermal stresses, preventing leak-tight closure between the plug and seat. This condition is alleviated by interposing a flexible, spring diaphragm 130 between valve plug 8 and seat 124. A lip 132, protruding at right angles to the circumference of the diaphragm 130, firmly contacts valve seat 124 in the closed position. Due to its flexibility, the diaphragm 130 readily adapts to the distortions of the valve seat 124, and limits any leakage.

When closing the valve, the plug 8 is advanced into closing relationship with the inlet port 26 and the spring diaphragm 130 abuts against the valve seat 124. The fluid in annulus 24 is frozen by passing a cooling medium through coils 40, as described in connection with FIG. 1, thereby providing a leak-tight barrier to the passage of liquid metal through the valve, irrespective of distortion in the valve seat and plug.

Figure 6:
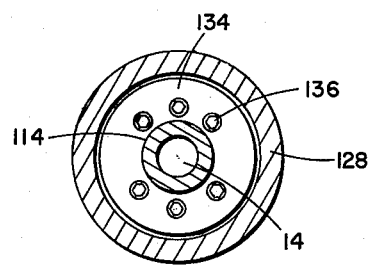
FIG. 6 is a sectional view taken along the line 6—6 of FIG. 4.

The valve is opened by shutting off the flow of coolant and retracting the valve plug 8 to the end of the chamber 18 opposite the inlet port 26. In this position of the plug, the flow of liquid metal through the inlet and outlet ports is unobstructed. A flow turning vane 134 affixed to the base of plug 8, effects a smooth fluid transition through the valve. FIG. 6 shows the manner in which the vane 134 is fastened to the plug 8.

The valve plug is operated by a handwheel, or an automatic operator (not shown), which engages the end of the valve stem 14. The operator imparts rotational motion to stem 14 which actuates valve plug 8 translationally through chamber 18.

The plug 8 and stem 14 are supported by a column 82 resting on base plate 84. A bearing housing 138 bracketed to the column 82 encases a bearing 140 on which stem 14 is journaled at flange 142. The play of the bearing 140 is regulated by an adjustment nut 144 and a lock nut 146 fastens the assembly in place.

The valve chamber 18 is sealed in the same manner as in FIG. 1, with a thin stainless steel gasket 86. The gasket includes, as described above, a centrally located tubular housing 90 encasing the valve stem 14. Cooling coils 94 freeze the liquid metal in annulus 96 between the valve stem 14 and housing 90 to produce a seal therein. This seal is also supplemented by a conventional packing seal 98, contained in the stuffing box 92. The stuffing box 92 includes a cavity 148 having a clean-out drain 150 through which liquid metal leakage can be accumulated and removed.

Figure 7:
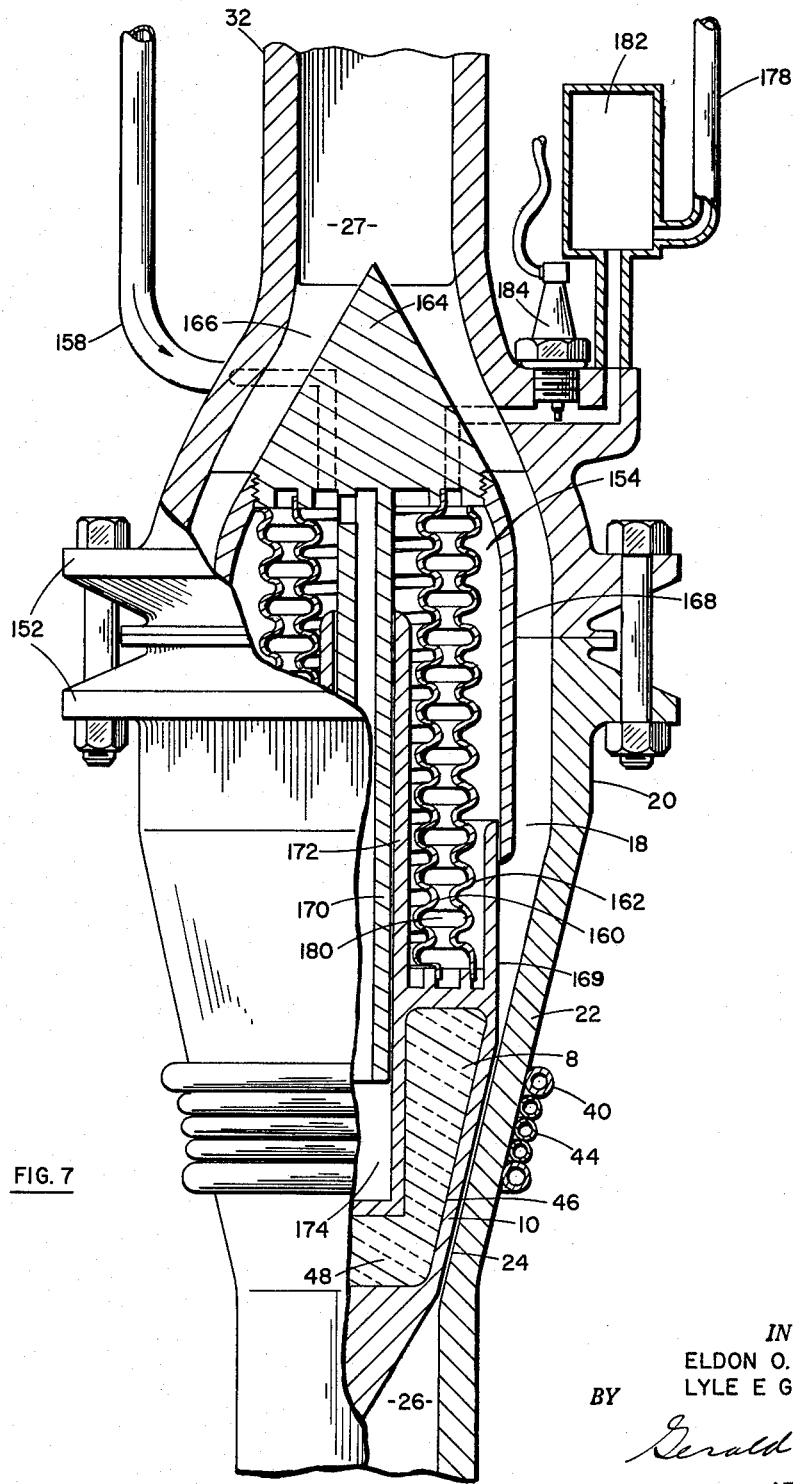
FIG. 7 is a partial sectional view in elevation of a third embodiment of our invention.

The embodiment illustrated in FIG. 7 represents a straight-through type valve employing the same means of producing a leak-tight barrier as the embodiments described hereinbefore. In the same manner as the valves shown in FIGS. 1 and 4, this valve is closed by diverting the liquid metal flowing through the valve 20 into a narrow annulus 24 formed between plug 8 and valve chamber 18 and freezing it therein. The distinguishing feature of this embodiment is in the means of actuating the valve plug 8.

The plug 8 moves reciprocatingly in valve chamber 18 comprised of two symmetrical and approximately conical sections which converge to an inlet port 26 at one end of the chamber 18 and an outlet port 27 at the opposite end. Flanges 152 are provided for fastening the two chamber sections together and to facilitate disassembly of the valve.

A gas operated bellows 154 concentrically supported in chamber 18, actuates valve plug 8. When closing the valve, bellows 154 is pressurized by introducing helium gas through gas inlet tube 158, and the expanding bellows advances plug 8 into inlet port 26. In this position, plug 8 and chamber 18 form a narrow annular channel 24 therebetween, into which the incoming liquid metal is diverted. A cooling medium flowing through coils 40 freezes the liquid metal in annulus 24 to produce a positive, leak-tight seal. The valve is opened by stopping the flow of coolant and deflating bellows 154, which then retracts plug 8 from the inlet port 26 to the mid-section of valve chamber 18.

The bellows plug actuator 154 utilizes as a safety feature two concurrently operating bellows providing backup for each other, an inner bellows 160 concentric with an outer bellows 162, which are separated by annulus 180. Failure of either bellows does not render the valve inoperative and the faulty bellows can be replaced at a convenient time. A tie member 164 supported on a rib 166 anchors one end of both bellows 160 and 162, and valve plug 8 is connected to the other ends. A tubular shroud comprising two unconnected sections 168 and 169 encloses bellows 154, protecting it from impingement by particulate matter in the flowing stream. One section of the shroud 168 is threadably connected to the tie member 164 and, therefore, is immobile. The second section 169, integral with the valve plug 8, slidingly adjoins the inner surface of the first section. When the bellows 154 is expanding or contracting, the plug is guided through chamber 18 by a stem 170 within a sleeve 172 and a cylindrical cavity 174. The sleeve 172 projects centrally through the chamber 18 to receive stem 170 suspended from the tie member 164. The stem 170 slidingly contacts the inner surface of sleeve 172 and cavity 174 to produce translational plug motion when the valve is opened or closed.

If a leak occurs in either bellows, two alternative methods of detecting such failure are provided. In the first method, a pressure gage (not shown) communicates through the gas leakage tube 178 with the annulus 180. The annulus 180 is filled with a gas at a pressure intermediate to the liquid metal line pressure and the gas pressure in the inner bellows 160. A pressure reading on the gage approximating the liquid metal line pressure is indicative of a leak in the outer bellows and if the gage measurement follows the pressure of the bellows operating gas, the inner bellows has failed. In the event of a leak in either bellows, gas or line pressure fluctuations could adversely affect the effectiveness of the valve by causing the plug 8 to move. This condition is alleviated by providing an expansion tank 182 which dampens out pressure fluctuations occurring in bellows 154.

The second leak detection method provides a means of detecting a leak in the outer bellows 162. A spark plug detector 184 is connected to the gas leakage tube 178. If liquid metal leaks through the outer bellows 162 and into gas tube 178, a circuit in spark plug 184 is completed, thereby actuating an external alarm circuit located in the control room or other appropriate place.

It should be understood that the foregoing examples are illustrative rather than restrictive of our invention, which should be understood to be limited only as indicated in the appended claims.

Having described the present invention what is claimed as novel is:

1. A valve comprising a housing having inlet and outlet ports, a shafted valve plug in said housing, said plug and said housing defining a channel therebetween connecting said inlet and outlet ports, said plug being adapted to control fluid flow through said valve between said ports and to direct fluid into said channel, and means for freezing said fluid in said channel to form a leak-tight frozen plug and shaft seal.

2. A leak-tight valve comprising a housing having fluid inlet and outlet ports, a shafted plug member disposed in said housing for controlling the passage of liquid metal between said ports, said plug and said housing adapted to define a channel therebetween connecting said inlet and outlet ports into which said liquid metal is divertable, means for moving said plug member relative to the path of fluid flow between said ports to open and close the valve, and means for freezing said diverted fluid in said channel to provide in combination with said shafted plug in a closed position, a leak-tight barrier to liquid metal flow.

3. A leak-tight liquid metal valve comprising a chamber having inlet and outlet ports, a shafted plug movably mounted in said chamber for controlling liquid metal flow through said valve; means for actuating said plug from a first open position into a second closed position with repect to at least one of said ports, said shafted plug spaced from said chamber in said second position to define an annular channel connecting said inlet and outlet parts wherein said liquid metal is diverted, and coolant means disposed adjacent said channel for freezing said metal in said channel.

4. A leak-tight liquid metal valve comprising a chamber having inlet and outlet ports communicating with said liquid metal, a movable plug positioned in said chamber and adapted to control the fluid flow area between said ports, means responsive to an external source of power for actuating said plug from a first open position removed from said ports into a second closed position in the path of fluid flow, wherein in said second position said plug substantially blocks said inlet port and forms an annular passage between said plug and said chamber into which said liquid metal is directed, and means for freezing said liquid metal in said annular passage.

5. A liquid metal valve comprising a chamber having a fluid inlet port coaxial with the longitudinal axis of said chamber and a fluid outlet port located intermediate to the ends of said chamber; a valve plug adapted to travel axially in said chamber, said plug abutting said inlet port at a first closed limit of travel whereby said plug and said chamber form a channel therebetween connecting said inlet and outlet ports into which said liquid metal is diverted, said plug clearing said egress port at a second open limit of travel to permit liquid metal travel through said valve, means for moving said plug, and means for freezing said liquid metal received into said channel in said closed position, thereby providing a frozen seal therein.

6. A valve comprising a chamber having communicating fluid inlet and outlet ports penetrating therein, a shafted valve plug rotationally positioned in said chamber adjacent said ports, said plug having a conduit therethrough, the shaft plug and chamber forming a channel there between into which said liquid metal is divertable, means for moving said plug, said conduit communicating with said ports in a first open position whereby the passage of liquid metal through said valve is unimpeded, said conduit being angularly displaced from said ports in a second closed position wherein liquid metal is diverted into said channel, and means for freezing said diverted liquid metal in said channel to provide a frozen plug and shaft seal.

7. A liquid metal valve comprising a housing having coaxial fluid inlet and outlet ports laterally penetrating therein, a valve plug positioned in said housing adjacent said ports, the plug and housing forming a first annular channel therebetween connecting said inlet and outlet ports, a lateral conduit traversing centrally through said plug, the axis of said conduit coplanar with said port axes, said conduit aligning with said ports in a first open position whereby the passage of liquid metal through said valve is unimpeded, said conduit angularly displaced from said ports in a second closed position wherein said liquid metal flow through said valve is substantially stopped and diverted into said channel, means for imparting motion to said plug, shaft means joining said moving means and said plug, said shaft means and said housing defining an annulus, said second annulus communicating with said first annulus and adapted to receive liquid metal leakage therefrom, cooling means disposed contiguously to the periphery of said housing adjacent each said annulus to provide frozen valve body and valve stem seals.

8. A liquid metal valve comprising a chamber having coaxial fluid inlet and outlet apertures penetrating said chamber, a valve plug positioned in the flow path through said chamber, a bellows mounting said plug thereon, said bellows imparting reciprocating motion to said plug in response to an external source of power, the inlet port being substantially closed off by said plug at one limit of travel, wherein said chamber and plug form a channel therebetween into which said liquid metal is diverted, and coolant coils wrapped contiguously around the periphery of said chamber adjacent said inlet port, the coolant in said coils freezing said liquid metal in said channel, thereby providing in combination with said plug a leak-tight barrier to fluid flow.

9. A liquid metal valve comprising a flow control plug spaced from a valve housing to define an annular channel, means for actuating said plug into a closed position to substantially eliminate fluid flow, means for directing fluid into said annulus in said closed position, an annular valve stem channel communicating with said plug annulus to receive liquid metal leakage therefrom, and means adjacent each of said channels to provide frozen valve body and valve stem seals.

10. A liquid metal valve which effects leak-tight shut-off, comprising a valve chamber having liquid metal inlet and outlet ports; a plug movably mounted in said chamber, said plug having a first open position permitting movement of fluid through said chamber between said ports and a second position in the path of liquid metal flow, the plug being annularly spaced from said chamber in said second position thereby shunting said liquid metal into said plug annulus, means for actuating said plug through said first and second positions, a valve stem joining said plug and said actuating means to transmit motion to said plug, said stem and said valve chamber defining an annulus therebetween connecting said inlet and outlet ports, said stem annulus communicating with said ports to receive liquid metal leakage, and means to freeze said liquid metal in each plug and stem annulus to form frozen valve body and valve stem seals.

References Cited in the file of this patent

UNITED STATES PATENTS

| | | |
|---|---|---|
| 1,461,520 | Forman | July 10, 1923 |
| 2,495,081 | Thomas | Jan. 17, 1950 |
| 2,513,650 | Johnston | July 4, 1950 |
| 2,723,108 | Butler | Nov. 8, 1955 |
| 2,919,710 | Lantz | Jan. 5, 1960 |
| 2,942,615 | Dayton | June 28, 1960 |
| 2,945,504 | Bredtschneider | July 19, 1960 |
| 2,992,017 | Dritz | July 11, 1961 |

FOREIGN PATENTS

| | | |
|---|---|---|
| 645,873 | Germany | June 4, 1937 |